United States Patent
Nguyen et al.

(10) Patent No.: US 10,430,309 B2
(45) Date of Patent: Oct. 1, 2019

(54) DUPLICATING A TASK SEQUENCE FROM A GRAPHICAL USER INTERFACE INTERACTION FOR A DEVELOPMENT APPLICATION IN VIEW OF TRACE DATA

(71) Applicant: Red Hat, Inc., Raleigh, NC (US)

(72) Inventors: Filip Nguyen, Brno (CZ); Filip Elias, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 653 days.

(21) Appl. No.: 14/629,092

(22) Filed: Feb. 23, 2015

(65) Prior Publication Data

US 2016/0246465 A1    Aug. 25, 2016

(51) Int. Cl.
  *G06F 11/30*  (2006.01)
  *G06F 11/34*  (2006.01)

(52) U.S. Cl.
  CPC ...... *G06F 11/3041* (2013.01); *G06F 11/3414* (2013.01); *G06F 11/3438* (2013.01)

(58) Field of Classification Search
  None
  See application file for complete search history.

(56) References Cited

U.S. PATENT DOCUMENTS

| | | | |
|---|---|---|---|
| 7,653,896 B2 | 1/2010 | Herdeg, III | |
| 7,712,074 B2 | 5/2010 | Ren | |
| 7,899,847 B2 * | 3/2011 | Lau | G06F 8/34 707/803 |
| 8,418,149 B2 * | 4/2013 | Krauss | G06F 11/3636 717/127 |
| 8,677,324 B2 * | 3/2014 | Markuza | G06F 11/3414 717/124 |
| 8,966,447 B2 * | 2/2015 | Hoke | G06F 11/3696 717/124 |
| 9,223,681 B2 * | 12/2015 | Delporte | G06F 11/3636 |
| 9,836,379 B2 * | 12/2017 | Badea | G06F 11/3471 |
| 2005/0166190 A1 | 7/2005 | Hoefler et al. | |
| 2005/0268285 A1 | 12/2005 | Bagley et al. | |

(Continued)

OTHER PUBLICATIONS

Ravindranath et al. "AppInsight: mobile app performance monitoring in the wild." 10th {USENIX} Symposium on Operating Systems Design and Implementation 2012.Retrieved on [May 16, 2019] Retrieved from the Internet:URL<https://www.usenix.org/system/files/conference/osdi12/osdi12-final-91.pdf> (Year: 2012).*

(Continued)

*Primary Examiner* — Thuy Dao
*Assistant Examiner* — Cheneca Smith
(74) *Attorney, Agent, or Firm* — Lowenstein Sandler LLP (57) ABSTRACT

A computing system provides a recording, by a processing device, trace data that is generated for one or more graphical user interface (GUI) interactions of a user. The computing system extracts a subset of the trace data from the recorded trace data, the subset of trace data being associated with one or more GUI interactions specifying operations of a development application performed on a work item. The computing system assembles a script in view of the subset of the trace data to duplicate the operations of the development applications specified by the one or more GUI interactions for one or more other work items.

17 Claims, 5 Drawing Sheets

(56) References Cited

U.S. PATENT DOCUMENTS

| | | | |
|---|---|---|---|
| 2008/0162888 A1* | 7/2008 | Krauss | G06F 11/3636 712/216 |
| 2009/0164979 A1* | 6/2009 | Fischer | G06F 11/3476 717/128 |
| 2009/0199096 A1 | 8/2009 | Pop-Jordanov et al. | |
| 2009/0248390 A1* | 10/2009 | Durand | G06F 11/261 703/23 |
| 2010/0153515 A1* | 6/2010 | Lau | G06F 8/34 709/217 |
| 2012/0089931 A1 | 4/2012 | Steinhauer | |
| 2012/0198476 A1* | 8/2012 | Markuza | G06F 11/3414 719/318 |
| 2014/0237454 A1* | 8/2014 | Delporte | G06F 11/3636 717/128 |
| 2015/0046909 A1* | 2/2015 | Ligman | G06F 11/3688 717/131 |
| 2016/0041894 A1* | 2/2016 | Reid, III | G06F 11/3636 714/45 |

OTHER PUBLICATIONS

Nakamura et al "An application-independent system for visualizing user operation history." Proceedings of the 21st annual ACM symposium on User interface software and technology 2008. Retrieved on [May 16, 2019] Retrieved from the Internet:URL< https://dl.acm.org/citation.cfm?id=1449721> (Year: 2008).*

Oleksandr Reminnyi et al., "Creating an Effective GUI Automation Framework," DevX.com, Sep. 30, 2013, 4 pages, World Wide Web, http://www.devx.com/enterprise/creating-an-effective-gui-automation-framework.html.

Qing Xie et al., "Designing and Comparing Automated Test Oracles for GUI-based Software Applications," Department of Computer Science, University of Maryland, 2006, 38 pages, World Wide Web, http://www.devx.com/enterprise/creating-an-effective-gui-automation-framework.html.

Pekka Aho et al., "Automated Java GUI Modeling for Model-Based Testing Purposes," Eighth International Conference on Information Technology: New Generations, 2011, 6 pages, IEEE Computer Society, World Wide Web, http://www.devx.com/enterprise/creating-an-effective-gui-automation-framework.html.

Sebastian Bauersfeld et al., "GUITest: A Java Library for Fully Automated GUI Robustness Testing," ASE, 2012, 4 pages, ACM, Essen, Germany, World Wide Web, https://staq.dsic.upv.es/sbauersfeld/papers/ase12.pdf.

Atif Memon et al., "GUI Ripping: Reverse Engineering of Graphical User Interfaces for Testing," 2003, 10 pages, World Wide Web, http://www.devx.com/enterprise/creating-an-effective-gui-automation-framework.html.

Kanglin Li et al., "Effective GUI Test Automation: Developing an Automated GUI Testing Tool," Chapter 2: Available GUI Testing Tools vs. The Proposed Tool, SYBEX Sample Chapter, 17 pages, World Wide Web, http://www.devx.com/enterprise/creating-an-effective-gui-automation-framework.html.

Daniel R. Hackner et al., "Test Case Generator for GUITAR," Department of Computer Science, University of Maryland, 2008, 4 pages, World Wide Web, http://www.devx.com/enterprise/creating-an-effective-gui-automation-framework.html.

* cited by examiner

DUPLICATING A TASK SEQUENCE FROM A GRAPHICAL USER INTERFACE INTERACTION FOR A DEVELOPMENT APPLICATION IN VIEW OF TRACE DATA

TECHNICAL FIELD

The present disclosure relates to graphical user interface (GUI) interactions for a development application and, more particularly, for duplicating a task sequence from a GUI interaction in view of trace data.

BACKGROUND

A development application, such as an integrated development environment (IDE), is an application for developing a work item. Generally, development applications assist users in developing large scale work items, such as software-packages, databases, or documents. The large scale work items usually include tens to hundreds of components, such as software modules, database tables, or individual files.

Scripts are generally used to modify multiple components of work items. For example, changing the design of a table in a database can be repeated across multiple tables using a script to save development time. Custom scripts are traditionally generated by user input from a command line interface, which involves manually writing custom lines of code, and usually takes a prohibitive amount of time and user expertise. A development application generally includes GUI tools for users to modify a work item (e.g., software-package) or components of a work item. GUI tools of an application typically vary across different layouts, platforms, inputs, versions, or updates of the development application.

Built-in scripts in a GUI tool are typically programmed for the specific development application using predefined associations of known GUI tools. Built-in scripts in a GUI tool are limited to core operations and generally do not support non-core operations.

Conventional add-on script generators in a GUI tool typically record image cues (graphical elements, buttons, image recognition, etc.) or on-screen cursor locations to tie together user interface shortcuts. Conventional add-on script generators usually playback to the user interface shortcuts as on-screen animation and/or depend on outputting control over the GUI. User interface shortcuts fail typically due to variations in the GUI layout, platform, input, version, or an update of the development application.

Conventional script generation usually has few options for customization and limit a user's (e.g., developer) ability to repeat sequences of operations. Traditional script generators require a high degree of maintenance and support to remain operable, and have reduced reliability and compatibility for execution of scripts across different development applications, layouts, platforms, inputs, and/or versions.

BRIEF DESCRIPTION OF THE DRAWINGS

The present disclosure will be understood more fully from the detailed description given below and from the accompanying drawings of various implementations of the disclosure.

DETAILED DESCRIPTION

Implementations of the present disclosure describe duplicating a task sequence from a graphical user interface (GUI) interaction for a development application in view of trace data. A development application is an application that enables users (e.g., developers) to develop and/or edit a work item (e.g., software package, database) and/or components of a work item. A work item is a product of the development application stored in a memory. For example, a work item may be a software package, and a document or file may be a component of the software package. Developing large scale work items, such as databases, which generally include tens to hundreds of components, such as database tables, can take a significant amount of time.

Work items can be modified. The development application can include a GUI, which a user can interact with to more efficiently develop and/or edit a work item and/or a component of a work item. A GUI interaction is user input received via the GUI that specifies one or more operations of the development application to be performed on a work item and/or a component of a work item. For example, a GUI interaction may be a user selecting text in a document and clicking on a font button in the GUI, and the operation that is specified by the user selecting the text and clicking the font button is to change the font of selected text.

A development application can operate in a multi-layered architecture, which can include a presentation layer, an application layer, and a system level layer. When an operation is performed in response to a GUI interaction, data is communicated across the various layers. The presentation layer can facilitate user input and presentation of information to the user through the GUI, and contains the actual GUI elements for users to view and interact (e.g., click) with. At the presentation layer, the user can interact with the GUI to engage one or more GUI elements (e.g., buttons, drop down menu, icons, dialog box, etc.) of the development application to indicate modification(s) that are to be made to the work item and/or component. An application layer can interpret the user input received via the presentation layer to determine the operation(s) to be performed, and can communicate command(s) that correspond to the operation to the system level layer. The system level layer can include software and/or hardware of a machine that can perform actions to execute the operation that is specified by the GUI interaction. For example, the operating system, as part of the system level layer, can process system calls to change the font value that is stored in memory for the selected text.

A task sequence can be a set of GUI-agnostic actions that are performed at the system level layer for executing the operation that is specified by the GUI interaction. The task sequence can represent a set of instructions (e.g., method calls, system calls, variables, etc.) for executing the operation, described in detail with relation to FIG. 2.

Trace data is data that reflects the underlying behaviors that occur at the system level layer that correspond to the operation specified by the GUI interaction. Trace data is generated, for example, by the operating system executing the task sequence. The trace data can be monitored and/or recorded by an agent. A task sequence can be extracted from a recorded set of trace data.

Implementations of the present disclosure create a script from trace data that is recorded for executing an operation specified by a GUI interaction. The script, when executed, can duplicate the operation (e.g., modify) of the development application specified by the GUI interaction on a work item and/or a component of a work item. Unlike conventional scripting solutions that only support core GUI operations, implementations of the present disclosure can duplicate any operation of the development application specified by a GUI interaction for performing an action on a work item and/or component. Core GUI operations are limited to functionality with predefined scripts or direct mappings. Non-core GUI operations can include any operation that deviates from the predefined scripts. Examples of non-core GUI operations can include, but are not limited to, a sequence of multiple core operations, a sequence of custom operations, and/or unmapped operations newly added to the development application.

In one implementation, a duplication script is GUI-agnostic, such that, the script executes across various development applications with different user interface layouts, versions, etc. Creating a script from recorded trace data for a GUI interaction, as described herein, is compatible with GUI interactions with any user input means supported by the presentation layer. The script created from recorded trace data for a GUI interaction, as described herein, can also execute independent of output to the presentation layer thereby enhancing playback performance and resilience between different GUI platforms and development applications.

Figure 1:
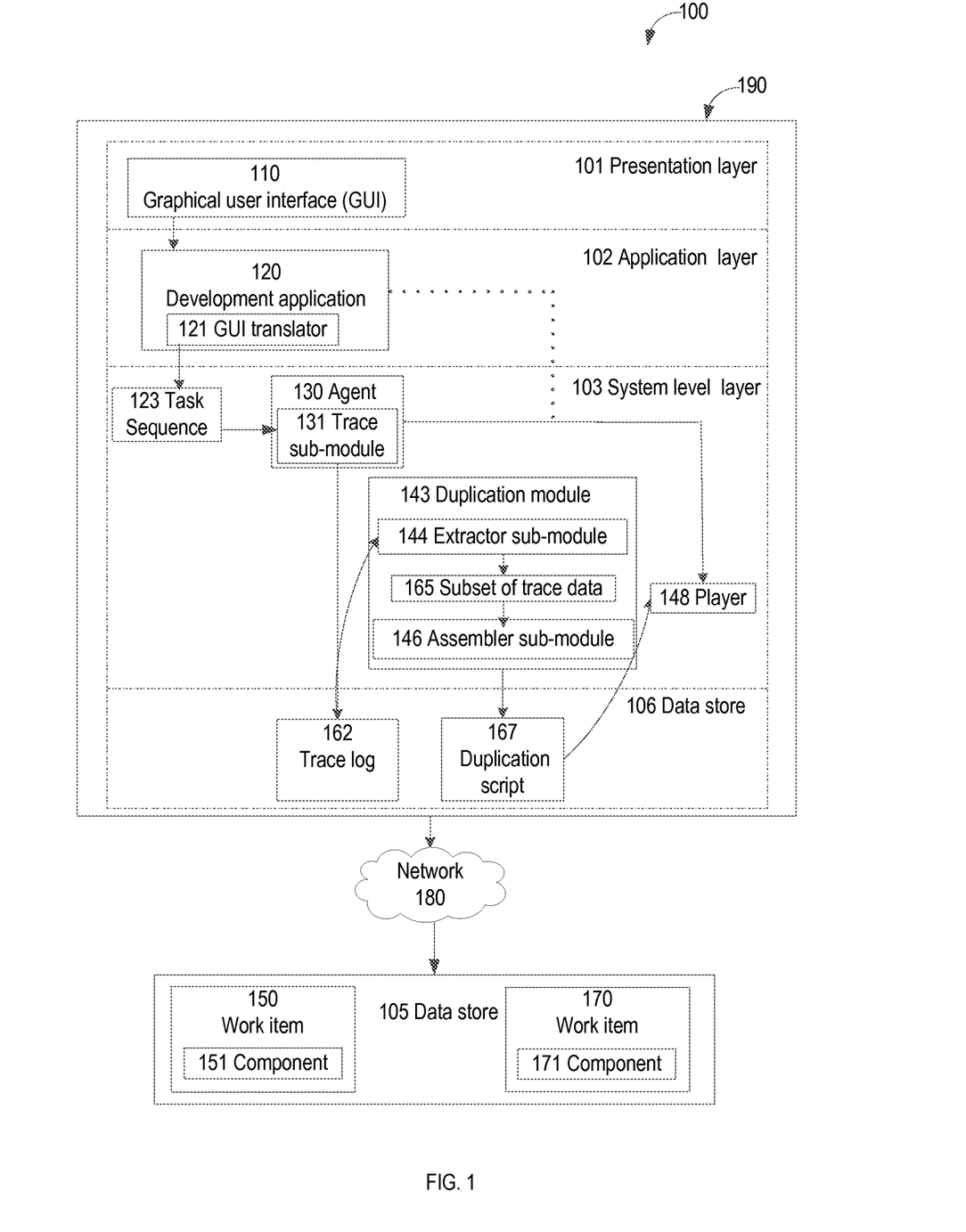
FIG. 1 illustrates an example system architecture, in accordance with various implementations.

FIG. 1 illustrates a system architecture 100, in accordance with various implementations. In one implementation, the system architecture 100 can include a computing machine 190 executing one or more development applications 120 (e.g., computer-aided software development application, integrated development environment, middleware solution, thick client, etc.). The system architecture 100 can include a computing machine 190 coupled to one or more data stores 105, 106 via one or more networks 180. The network 180 may be public networks (e.g., the Internet), private networks (e.g., a local area network (LAN) or wide area network (WAN)), or a combination thereof. The databases 113A,B can be geographically decentralized.

The computing machine 190 can be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. Computing machine 190 can include one or more processing devices, memory, and/or additional devices such as a graphics card, internal input/output (I/O) device, keyboard, mouse, speaker, etc.

The computing machine 190 can include a presentation layer 101, an application layer 102, and a system level layer 103. The application layer 102 can include the development application 120, which can run on an operating system that executes at the system level layer 103. Users can interact with the development application 120 via a graphical user interface (e.g., GUI 110), which executes at the presentation layer 101, to develop one or more work items 150,170 and/or one or more components 151, 171 of the work items 150,170.

A work item 150,170 can be a product of the development application 120. Examples of work items 150,170 can include, and are not limited to, software-packages, databases, and documents. A work item 150,170 can include one or more components 151,171. For example, a software-package may have software modules as components, a database may have database tables as components, and a document may have document headers and/or footers as components.

The work items 150,170 and components 151,171 can be stored in a data store 105 or data store 106. Data stores 105 and/or 106 can be a persistent storage unit. A persistent storage unit can be a local storage unit or a remote storage unit. Persistent storage units can be a magnetic storage unit, optical storage unit, solid state storage unit, electronic storage unit (e.g., main memory) or similar storage unit. Persistent storage units can be a monolithic device or a distributed set of devices. A 'set', as used herein, refers to any positive whole number of items.

As described above, one or more operations can be performed on a work item 150,170 and/or component 151, 171. The development application 120 can access the work items 150,170 and/or components 151,171 in the data store 105 to perform the one or more operations on one or more of the work items 150,170 and/or components 151,171. Operations can include creating a work item and/or component, modifying a work item and/or component, deleting a work item and/or component, and/or overwriting a work item and/or component.

User input can be received by the GUI 110 to specify the one or more operations to perform on a work item 150,170 and/or component 151,171. The user can engage a GUI element (e.g., icons, buttons, menus, menu items, etc.) of the GUI 110 to specify one or more operations of the development application 120 to be performed. As described above, a GUI interaction is user input received via the GUI 110 that specifies an operation of the development application to be performed on a work item 150,170 and/or a component of work items 151, 171. When the operation (e.g., modify) is performed, GUI 110 can display the change(s) to a work item 150,170 and/or component 151, 171.

The development application 120 at the application layer 102 can receive information from GUI 110 at the presentation layer 101 for performing the operation(s) specified by the GUI interaction. The information that is received from GUI 110 can include GUI element data (e.g., interface shortcuts, parameters, etc.), which the development application 120 can use to relate the user input to an operation of the development application 120. The GUI element data (e.g., interface shortcuts, parameters, etc.) can enable application defined associations between the GUI elements and operations of the development application 120.

The development application 120 can include a GUI translator 121 to interpret the information (e.g., GUI element data) received from GUI 110 and determine a corresponding operation to be performed on the one or more work items 150,170 and/or one or more components 151,171. The GUI translator 121 can translate the user input into non-platform-specific code. For example, if the information (e.g., GUI element data) from the GUI 110 indicates that text is selected and the font button is activated, the GUI translator 121 may translate the information to correspond to an operation of the development application for changing an assigned font value stored in memory for the selected text.

To translate the information (e.g., GUI element data), the GUI translator 121 in the development application 120 can identify one or more commands, which correspond to the information, for the operating system to perform at the system level layer 103, and can send the commands to the operating system at the system level layer 103. For example, the GUI interaction may include user input selecting a header of a document and the user activating a font size button. The GUI 110 at the presentation layer 101 can send GUI element data pertaining to the GUI interaction to the GUI translator 121 at the application layer 102. The GUI translator 121 can generate a task sequence 123 that can be executed by the operating system to perform changes (e.g., change font size) to the work item 160 (e.g., header of a document). The task sequence 123 can include method calls, system calls, variables, etc. for the operating system to use in order to perform changes to the work item 160. The operating system can receive the task sequence 123 from the GUI translator 121. The operating system generates trace data reflecting the processing of the task sequence 123.

The system level layer 103 can include a kernel as the central component of the operating system that bridges the development application 120 at the application layer 102 to the data processing that is performed by hardware of the computing machine 190. An example of an operating system is the Linux® operating system. In one implementation, trace data can be in the form of binary instructions for data processing by the kernel (e.g., bytecode).

The trace data can include irrelevant data that is generated by the operating system and is not related to a GUI interaction or to performing the specified operation on the work item 150 and/or component 151. An example of irrelevant data in the trace data can include data pertaining to other processes or threads of the operating system that are not related to GUI interaction that specifies the operation to be duplicated. For example, the trace data can include data pertaining to a user closing an informative pop-up window, which is user interaction with the GUI that is not related to the GUI interaction to modify the work item 150 and/or component 151. In one implementation, the user can select a task identifier (task ID) or process identifier (PID) of the development application 120 to instruct an agent 130 as to which trace data the agent 130 should record.

The agent 130 can record the trace data in a trace log 162. The agent allows for monitoring and examination of the activities of the development application that is executing. The trace data is generated for actions that occur below the presentation layer (i.e., at the application layer 102 and/or system level layer 103) and includes information from the application layer 102 and/or system level layer 103 to reflect the operating system and underlying hardware behavior (e.g., thread states and/or memory states of a processing device) that occurs as instructed by the task sequence. In one implementation, the agent 130 runs on the operating system of the computing machine 190. In another implementation, the agent 130 runs directly on hardware to access the trace data at various levels of the computing machine 190, such as at the hardware level, operating system level, application level, and input/output level, etc. The agent 130 can be part of a duplication module 143 or separate from duplication module 143.

In one implementation, agent 130 is a Java™ virtual machine (JVM). A JVM is a virtual machine to monitor trace data (e.g., Java bytecode, system behavior, etc.). Such trace data includes, but is not limited to, bytecode, information extracted from a class file, an object to be instantiated by a Java™ application (e.g., development application 120), a parameter to methods, a return value, local variables, and/or intermediate results of computations. It should be understood that implementations can include different hardware and/or different operating systems. The agent 130 can include the trace sub-module 131 that records the monitored trace data into the trace log 162 stored in the data store 106.

The trace log 162 can store state data (e.g., trace file, memory heap, trace runs, and/or thread dump, etc.). The trace log 162 can include multiple log versions. The log versions in the trace log 162 can include data that represent multiple instances of an operation that is specified by the GUI interaction, for example, when a user repeats the operation of the development application, as described in reference to FIGS. 2-4. In one implementation, multiple log versions are used by an extractor sub-module 144 of the duplication module 143.

The duplication module 143 on the computing machine 190 can generate a duplication script 167 to duplicate an operation of the development application 120 as specified by a GUI interaction. Duplication module 143 can duplicate custom sequences of operation of the development application that executes independent of output to the GUI 110. For example, the duplication script 167 can associate a task sequence of an operation of the development application with instructions for the development applications 120 that are agnostic to a GUI platform or layout. The duplication module 143 can run as a standalone application or a feature of the development application 120. In one implementation, duplication module 143 includes an interface (not shown) to aid in altering or maintaining the duplication script 167, described in greater detail below in conjunction with FIG. 4.

Duplication module 143 can include an extractor sub-module 144 to extract trace data from the trace log 162. The extractor sub-module 144 can compare trace data in the trace log 162 in view of the work item 150 and/or component 151 to extract a subset of trace data 165 representing an operation of the development application specified by a GUI interaction, described in greater detail below in conjunction with FIGS. 2-4. Extractor sub-module 144 can output the extracted subset of trace data 165 (e.g., Java bytecode, method calls, variables, etc.) to an assembler sub-module 146.

The assembler sub-module 146 can assemble the extracted subset of trace data 165 into the duplication script 167. Assembler sub-module 146 assembles the duplication script in view of the extracted subset of trace data 165 to duplicate the operations for modifying one or more work items 150,170 and/or one or more components 151,171 as specified by the GUI interaction. For example, assembler sub-module 146 can assemble a sequence of instructions in view of the extracted trace data (e.g., Java bytecode, method calls, variables, etc.) to duplicate modifying the font size of the header in the document to re-create the operation of the development application for the user clicking the font button function. The assembler sub-module 146 can generate output of the duplication script 167 that, when executed, replicates the modification to one or more work items 150,170 and/or components 151,171. The assembler sub-module 146 is discussed in greater detail below in conjunction with FIGS. 2-4. In one implementation, the duplication script 167 executes by way of the agent 130 or via a separate player 148 in communication with the development application 120. The duplication script 167 is discussed in greater detail below in conjunction with FIG. 4.

Figure 2:
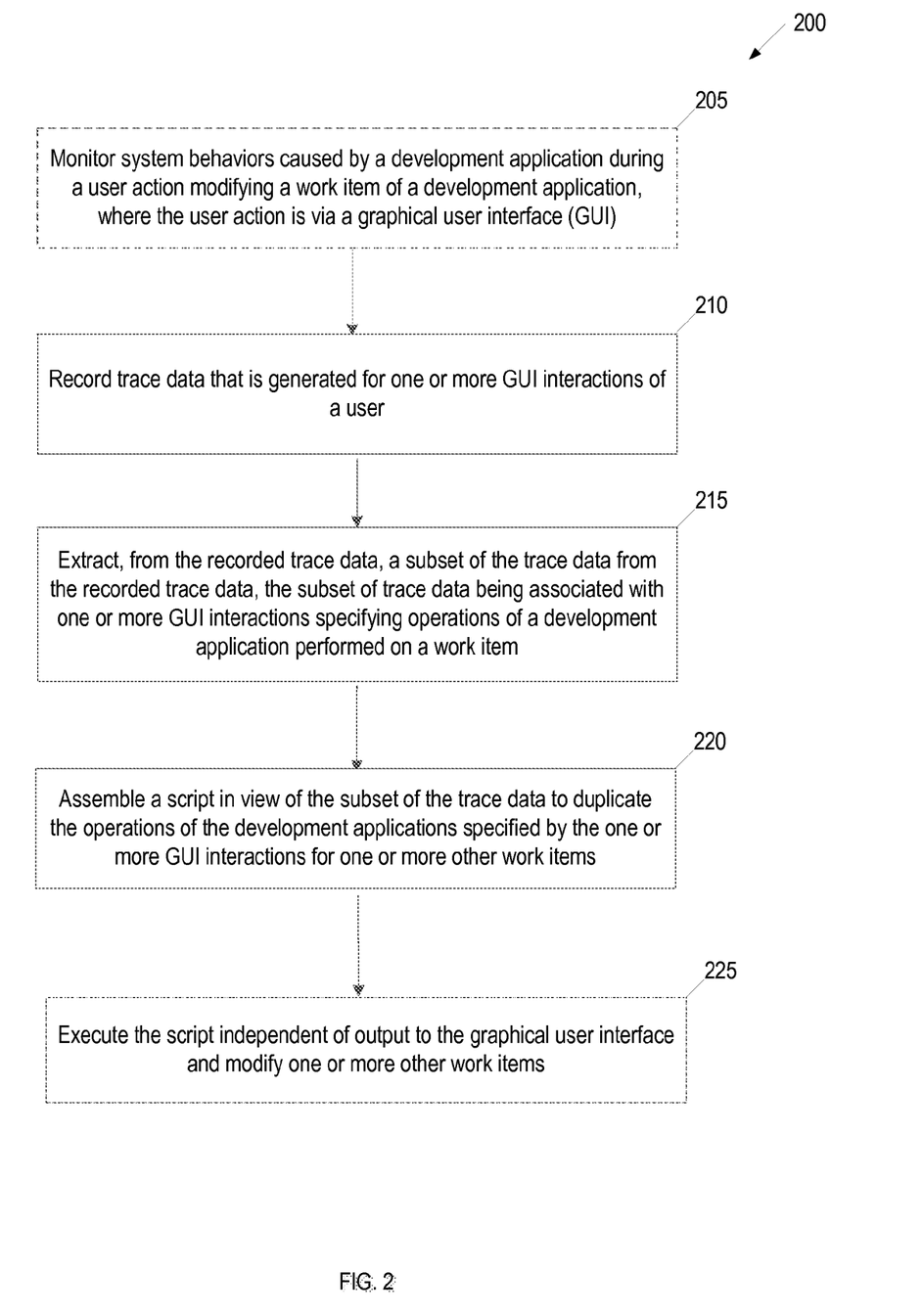
FIG. 2 is a flow diagram for a method for duplicating operations of a development application, in accordance with one or more implementations of the present disclosure.

FIG. 2 is a flow diagram of an implementation of a method 200 for duplicating an operation in a development application. Method 200 can be performed by processing logic that can include hardware (e.g., circuitry, dedicated logic, programmable logic, microcode, etc.), software (e.g., instructions run on a processing device), or a combination thereof. In one implementation, method 200 is performed by a duplication module (e.g., duplication module 143 of FIG. 1).

At block 205, the duplication module monitors trace data (e.g., system behaviors) caused by a development application during a GUI interaction of a user specifying an operation of the development application to be performed on a work item (e.g., document) produced by the development application. The GUI interaction of the user is via a GUI. A GUI interaction of a user modifying a document can repeat a sequence of actions to perform the modification to one or more other work items (e.g., documents). Each time the user interacts with the GUI (e.g., clicking a button or a selecting menu item), behaviors occur below the presentation layer, for example, at the application layer and/or the system level layer, that are associated with, for example, system thread states and/or memory states of a processing device (e.g., trace data). In one implementation, data that represents the multiple instances of an operation that is specified by the GUI interaction are recorded as log versions of the recorded GUI interaction. Multiple instances of the operation can be for the same operation of the development application performed with different values for performing the operation. As discussed above, trace data can include environment parameters, variables, system calls, hardware operations, etc.

At block 210, the duplication module records trace data that is generated when one or more GUI interactions of a user is detected. The duplication module can store the trace data in a trace log. The trace log can include extra trace data related to multiple processes executed by an operating system. In one implementation, the duplication module can include controls to trigger the recording of trace data. For example, a user can trigger the controls prior to interaction to perform the GUI interaction. In another implementation, the duplication module can receive input from the user indicating specific trace data to record. For example, the user can indicate a specific document, category of modification, or process identifier of the development application that indicates trace data to record. In one implementation, the agent (e.g., JVM or java agent) includes a software logging or tracing feature (e.g., java tracing tool) that creates a log. Duplication module controls can stop, pause, or create versions of the recorded trace data in the trace data log.

The user can repeat the GUI interaction of modifying the document to record data that represents the multiple instances of an operation that is specified by the GUI interaction. The multiple instances of the operation repeat a sequence of actions to perform the modification triggering the same or similar sequence of instructions. The actions performed with different values create the task sequence that call the same or similar variables to modify the work item and/or component. For example, the sequence of actions to modify the font size values call the same or similar variable for font size. The agent can record the multiple instances as log versions of the user modifying the work item, for example, changing the font heading to different font type values or size values, such as Times New Roman or Arial.

The recorded GUI interaction can include superfluous trace data irrelevant to modifying the document, such as reacting to a distraction in the GUI. Multiple recordings of the GUI interaction can increase the recognition of operations in the trace data during extraction. In one example, instances of the GUI interaction are recorded as trace data for the operation of the development application in the form of a trace run. A trace run is a sequence of method calls and parameters that can be sent by the development application for execution by an operating system.

At block 215, the duplication module extracts a subset of trace data associated with the GUI interaction from the recorded trace data. The subset of trace data corresponds to a task sequence for the operation of the development application specified by the GUI interaction. The subset of trace data can include, for example, one or more parameters, a sequence of method calls, and/or state data from the recorded trace data. Parameters can include variables to execute the operation of the application, such as file path, document fields, font size, etc. A task sequence of method calls to duplicate the operation of the development application can be extracted from recorded trace data. State data can include a memory heap, a thread state, an object, etc. Extracting the subset of trace data associated with the GUI interaction from the recorded trace data is described in greater detail below in conjunction with FIG. 3. The multiple instances of the operation specified by the GUI interaction trigger similar sequences of instructions that the duplication module can compare to extract the subset of trace data to duplicate the task sequence. In one implementation, the duplication module compares the recorded trace data among the multiple instances and identifies the method calls, system calls, state changes, and variables associated with the GUI interaction. The duplication module extracts the subset of the recorded trace data. The duplication module can select a portion of the subset of trace data associated with the GUI interaction from the recorded trace data to assemble a duplication script.

At block 220, the duplication module assembles the script in view of the subset of trace data to duplicate the action of the development application for modifying one or more other work items. The duplication module can apply various data manipulation techniques to parse, construct, look-up, etc. for assembling the subset of trace data as the duplication script. In some implementations, the assembled instructions can include variables, method calls, and state data from memory. The creation of the script is described in greater detail below in conjunction with FIG. 3.

At block 225, the duplication module executes the script independent of output to the GUI to modify multiple work items. The generated script includes instructions for development applications that are platform-neutral to a presentation layer and execute independent from output to the GUI. In one example, a JVM can be used to execute the script. In one implementation, the duplication module can receive input from the user indicating values for customizing duplication of the operation prior to the script executing, described in greater detail below in conjunction with FIG. 4.

Figure 3:
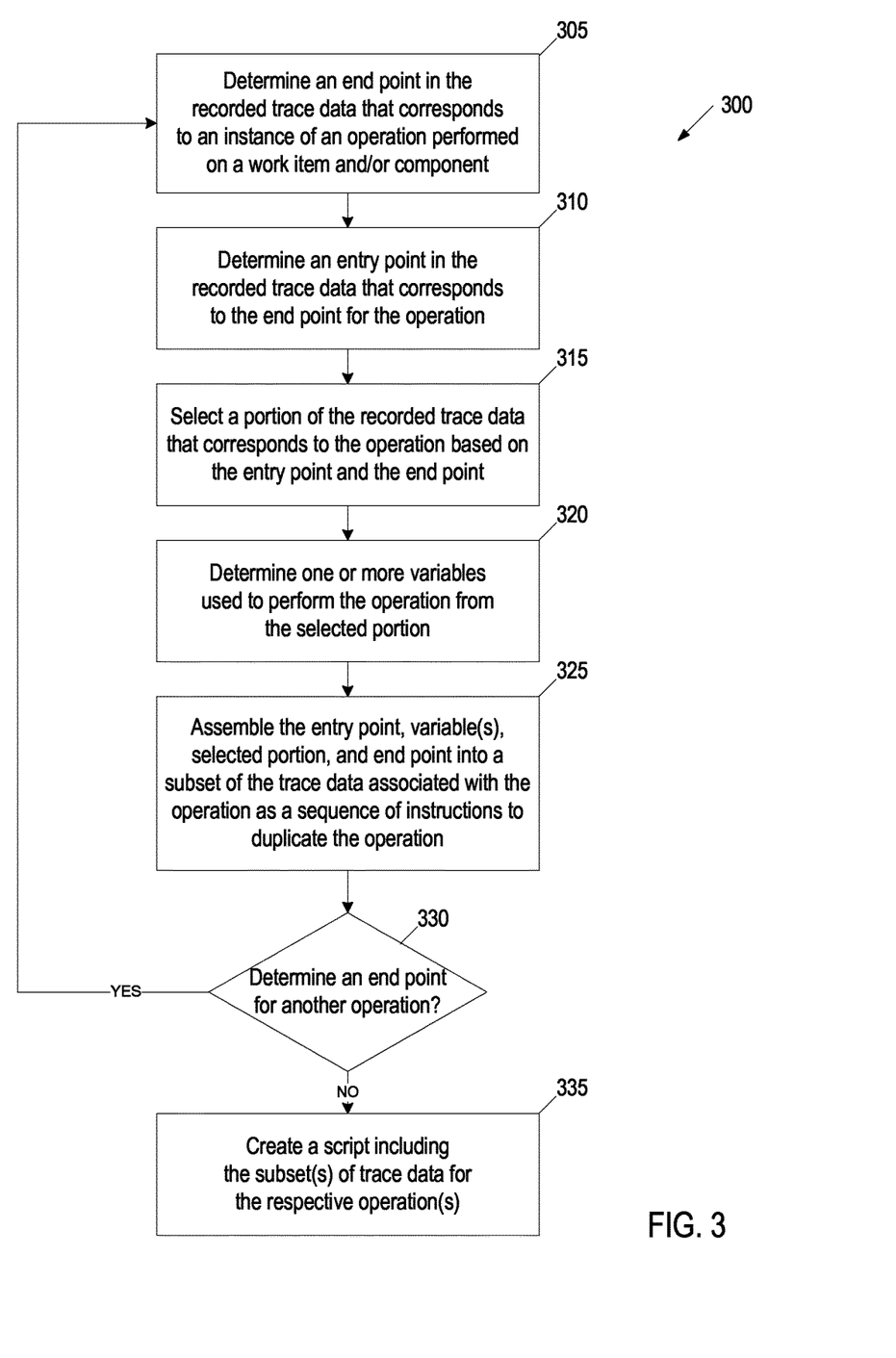
FIG. 3 is a flow diagram for a method for creating a script that duplicates operations of a development application, in accordance with one or more implementations of the present disclosure.

FIG. 3 is a flow diagram of an implementation for creating a script that duplicates operations of a development application. Method 300 can be performed by processing logic that can include hardware (e.g., circuitry, dedicated logic, programmable logic, microcode, etc.), software (e.g., instructions run on a processing device), or a combination thereof. In one implementation, method 300 is performed by a duplication module (e.g., duplication module 143 of FIG. 1).

At block 305, the duplication module determines an end point, in the recorded trace data, corresponding to an instance of an operation (e.g., modification) of the development application performed on a work item and/or component as specified in a GUI interaction. The recorded trace data (e.g., trace log 162 of FIG. 1) can be stored in a data store. The operation can include creating, modifying, deleting, and overwriting a work item and/or component. The operation can be an operation that is to be duplicated without user interaction.

The recorded trace data can represent actions performed at the system level layer for one or more task sequences that are executed by the operating system. There can be multiple instances of an operation that are performed on the work item and/or component. One or more of the instances can include different input values and/or parameters for performing the operation. For example, there may be a GUI interaction, where a user selects Text1 of a work item and changes Text1 to Font-X, followed by another GUI interaction, where the user selects a header of the work item and changes the header to Font-Size-Y, and yet followed by another GUI interaction, where the user selects Text2 of the work item and changes Text2 to Font-Z. In this example, there are two instances of changing the font of various text and one instance of changing the font size of a header. The recorded trace data can include data that represents the multiple instances of an operation that is specified by the GUI interaction. For example, the trace data can include portions of trace data that respectively represent changing Text1 to Font-X and changing Text2 to Font-Z.

The trace data can include timestamps, and the portions of the trace data that correspond to the instances of an operation (e.g., modification) performed on the work item and/or component can be in an order in the recorded trace data that is based on the timestamps. For example, the trace data can include a portion of trace data that represents changing Text1 to Font-X, followed by a portion of trace data that represents changing the header font size to Font-Size-Y, followed by a portion of trace data that represents changing Text2 to Font-Z.

Each portion of trace data that corresponds to an operation (e.g., change) performed on the work item and/or component can include a dynamic parameter, such as a specific type of call, that is used to change a value (e.g., font value, font size value) that is stored in memory to execute the operation (e.g., change font, change font size). For a change operation (e.g., change font, change font size), the dynamic parameter can be a write to memory call to change the value (e.g., font value, font size value) that is stored in memory for performing the change operation.

To identify an end point that corresponds to an instance of an operation (e.g., change font) at block 305, in one implementation, the duplication module searches the trace data for a dynamic parameter (e.g., write to memory call). The duplication module can start at the end of the recorded trace data and search backwards in the recorded trace data to find an end point (e.g., write to memory call). The duplication module can include processing logic to recognize dynamic parameters (e.g., write to memory calls) from a framework associated with the development application. In one implementation, the duplication module uses mappings and/or dynamic program analysis to identify an end point that corresponds to an operation (e.g., change) performed on the work item and/or component. Analysis of the trace data can locate an end point by mapping the logical state changes between activities to physical state changes. In one implementation, a profile of the trace data is used to dynamically analyze memory usage of a particular step or frequency and duration of call operations in the trace data. In one implementation, the duplication module analyzes program source code, object references, and/or binary executable code to determine an end point in the recorded trace data.

At block 310, the duplication module determines an entry point in the recorded trace data that corresponds to the end point for the operation. The duplication module can search backwards from the determined end point to locate a certain type of function call (e.g., main), and use the located function call as the entry point that corresponds to the end point.

At block 315, the duplication module selects a portion of the recorded trace data that corresponds to the operation in view of the entry point and the end point. As described above, the recorded trace data can include data that is not relevant to operations that are specified by GUI interactions. The duplication module can separate the recorded trace data that is associated with the operations from irrelevant data, and select a portion that is related to an operation to be duplicated. In one implementation, the duplication module traces the sequence of instructions in the selected portion from the end point backwards to the corresponding entry point to identify system call(s) and method call(s). For example, the duplication module may start at the end point which is a system write call to update memory, and may identify a method call in the selected portion that passed the font value to the system call. The duplication module may trace backwards from the method call that passed the font value to the method call that passed the location in the work item associated with the operation. The duplication module can continue to trace backwards to the entry point that corresponds to the end point.

At block 320, the duplication module determines one or more variables, from the selected portion, used to perform the operation. The duplication module can extract the variable(s) that are used for the operation. For example, for an overwrite operation, the duplication module can identify an attribute of the work item associated with the memory location. In one implementation, the duplication module compares data from a memory heap or thread dump for the final states of variables that were used in arguments in identified method calls.

At block 325, the duplication module assembles the entry point, variable(s), selected portion of trace data and end point into a subset of trace data for the operation as a sequence of instructions to duplicate the operation. The subset of trace data for the operation is a set of instructions, which when executed, duplicate the operation on a work item and/or component. The duplication module can use timestamps in the selected portion to manipulate the entry point, variable(s), selected portion of trace data and end point into the subset of trace data.

At block 330, the duplication module determines whether to determine an end point for another operation in the recorded trace data. As described above, the recorded trace data can include data to represent multiple operations (e.g., change Text1 to Font-X, change header to Font-Size-Y, etc.) that are performed on a work item and/or component. The duplication module can detect that there is data in the recorded trace data that has not been searched, which can indicate that there may be data for another operation in the recorded trace data. The duplication module can return to block 305 to determine an end point for another operation.

If the duplication module determines not to determine an end point for another operation (block 330), for example, because the duplication module detects that there is no other data to be searched in the recorded trace data, the duplication module creates a script including the subset(s) of trace data for the respective operation(s) at block 335. Each subset of trace data in the script can include an entry point to be used as a trigger, a corresponding selection portion of trace data, the corresponding variables, and a corresponding end point to perform the operation of the development application. An emulated environment (e.g., data structures, objects, states, libraries, etc.) of the development application can be used to execute the script to duplicate the operation(s), as described in greater detail below in conjunction with FIG. 4. It is noted that although described sequentially, the steps for the selection of the portion, identification of the entry point, and/or identification of variables can occur simultaneously. The duplication module can tailor the subsets of trace data to integrate into the development application framework for duplicating the task sequence. The duplication module can reuse the subsets of trace data with the target framework to assemble the script. For example, in a Java integrated development environment (IDE) development application, Swing and Abstract Windowing Toolkit (AWT) frameworks are used to derive functions and dependencies that carry out the operation. Swing is a toolkit in Java that can provide the graphical user interface components implemented in non-platform-specific code (i.e. Java). AWT provides an application programming interface (API) for GUI and rich clients in Java. APIs can be used to access the development application framework.

Figure 4:
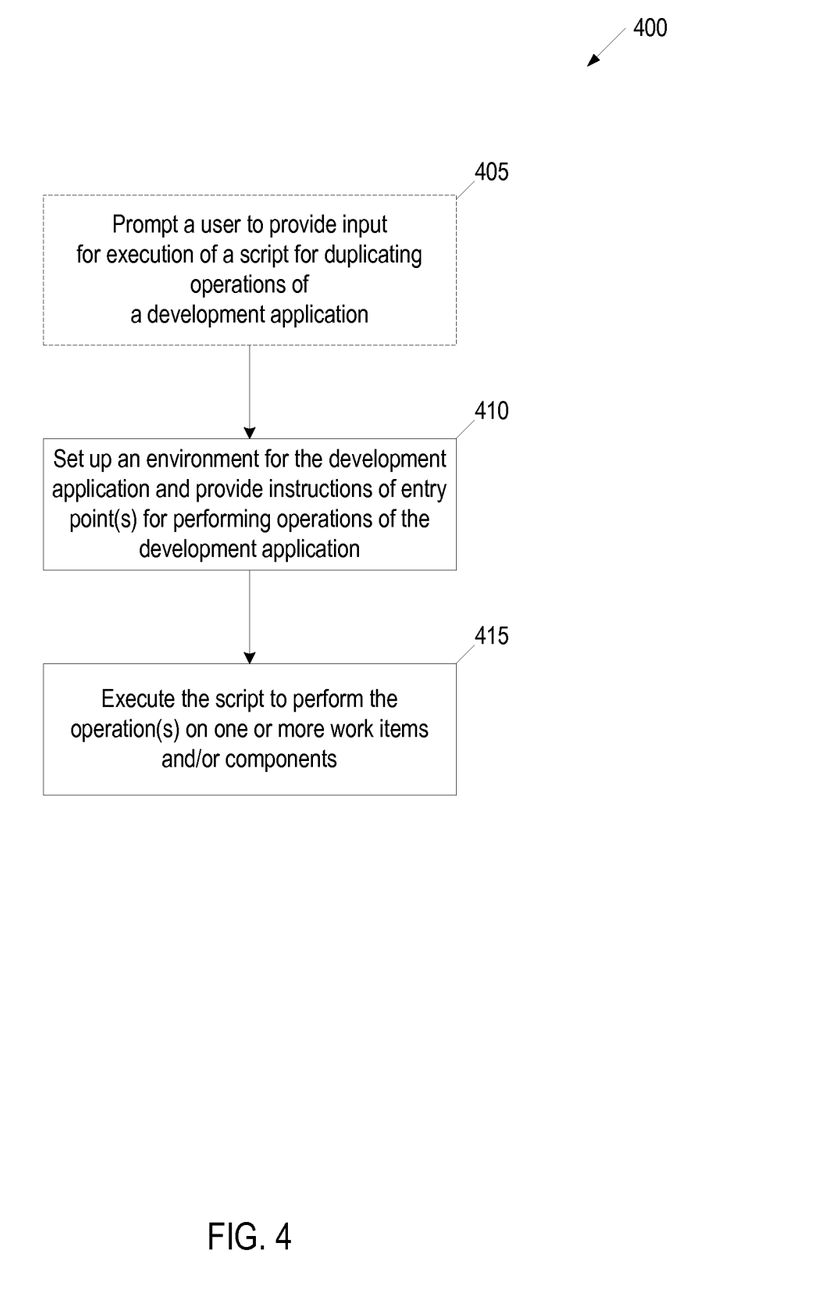
FIG. 4 is a flow diagram for a method for executing the script for duplicating operations of a development application, in accordance with one or more implementations of the present disclosure.

FIG. 4 is a flow diagram of an implementation for executing the script for duplicating operations of a development application, in accordance with one or more implementations of the present disclosure. Method 400 can be performed by processing logic that can include hardware (e.g., circuitry, dedicated logic, programmable logic, microcode, etc.), software (e.g., instructions run on a processing device), or a combination thereof. In one implementation, method 400 is performed by a duplication module (e.g., duplication module 143 of FIG. 1) executing on a computing machine or by a stand alone player (e.g., Player 148 of FIG. 1) executing on a computing machine.

At block 405, the computing optionally prompts a user to provide input for execution of the script for duplicating operations of a development application. The user input can include one or more target work items and/or one or more components to modify, one or more values, and/or input parameters. Input parameters for variables of the duplicated task sequence can be used to customize the operation(s) performed from executing the script. The user input can be received via a command line, dialogue box, and/or GUI interaction to specify the target work item, components, values, parameters, etc. For example, the user input may specify a font value and the computing machine can execute the script to duplicate the font change on the one or more target work items and/or components using the specified font value.

The computing machine can use an agent to emulate the environment of the development application. In one implementation, an agent (e.g., agent 130 of FIG. 1) can be used as a player (e.g., Player 148 of FIG. 1) to emulate the environment of the development application.

At block 410, the computing machine sets up an environment for the development application and provides instructions of the entry point(s) in the script for performing the operations of the development application. The computing machine can use an agent for setting up the environment. The computing machine can provide the instructions to the agent. An entry point of a corresponding subset of trace data can be used to load the development application to a state for the corresponding operation to be performed.

At block 415, the computing executes the script to duplicate the operation(s) on the one or more work items and/or one or more components. The duplication of the operations results in the one or more target work items and/or components being modified in memory. The script executes independent of the GUI (e.g., GUI 110 in FIG. 1) and without further user interaction. In one implementation, the computing machine blocks input and output to the GUI. The computing machine can execute the script to duplicate the operation(s) as a background process by the operating system and/or hardware that does not output to the GUI. Variations in platforms, GUI layouts or versions of the development application do not change and/or affect the execution of the script.

Figure 5:
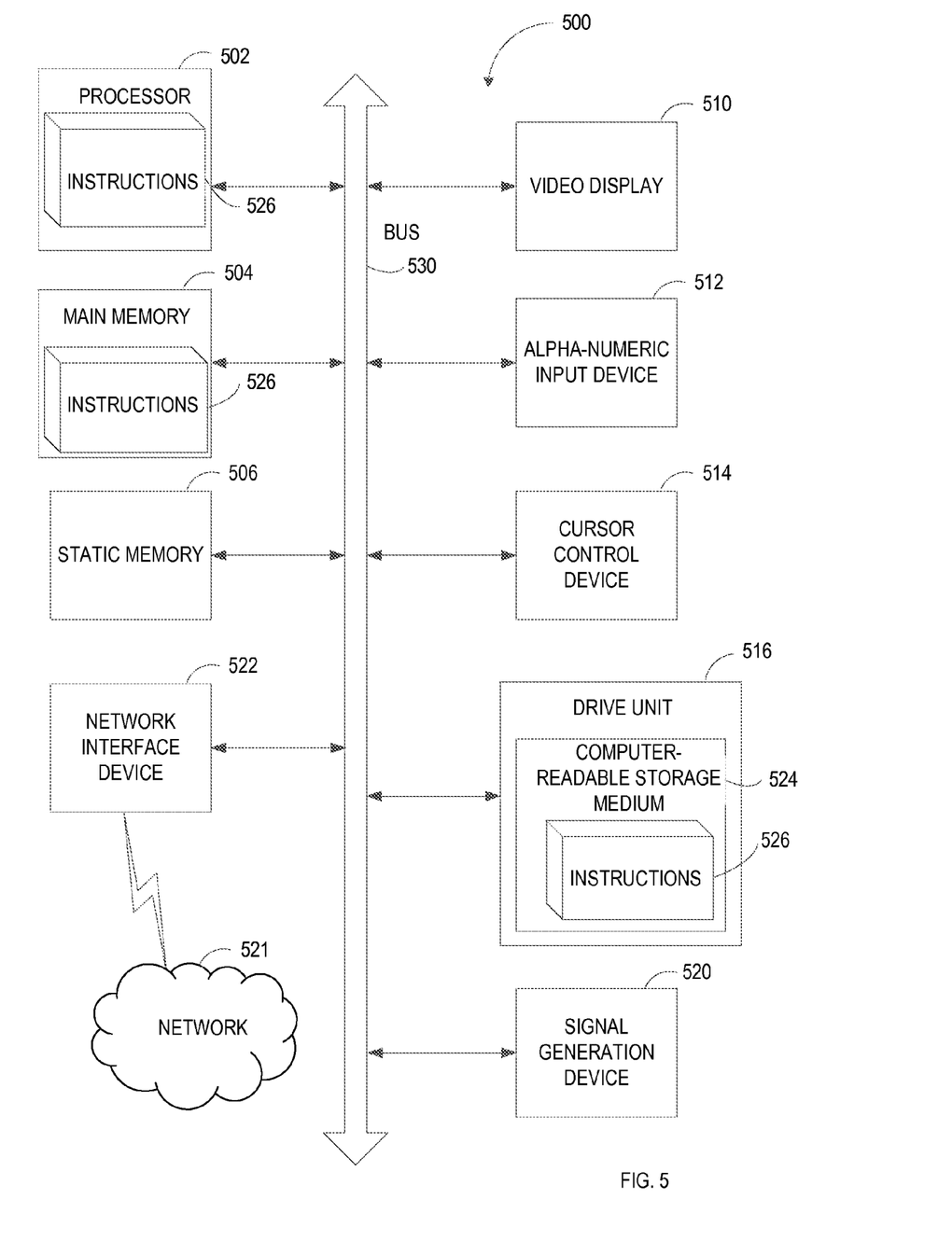
FIG. 5 is a block diagram of an example computer system that can perform one or more of the aspects described herein, in accordance with various implementations.

FIG. 5 is a block diagram of an example computer system 500 that can perform one or more of the operations described herein, in accordance with various implementations. FIG. 5 illustrates a diagrammatic representation of a machine in the form of a computer system 500 within which a set of memory instructions 526, for causing the machine to perform any one or more of the methodologies discussed herein, can be executed. In an alternative example, the machine can be connected (e.g., networked) to other machines in a Local Area Network (LAN), an intranet, an extranet, or the Internet. The machine can operate in the capacity of a server or a client machine in a client-server network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 500 includes a processor 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory 516 (e.g., a data storage device), which communicate with each other via a bus 530.

The processor 502 represents one or more general-purpose processing devices such as a microprocessor, central processing unit, or the like. More particularly, the processor 502 can be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 can also be one or more special-purpose processing devices such as an application specific integrated circuit (ASIC), a field programmable gate array (FPGA), a digital signal processor (DSP), network processor, or the like. The processor 502 executes the duplication module 143 for performing the operations and steps discussed herein.

The computer system 500 can further include a network interface device 522. The network interface device 522 can be in communication with a network 521. The computer system 500 also can include a video display unit 510 (e.g., a liquid crystal display (LCD), a touch screen, or a cathode ray tube (CRT)), an alphanumeric input device 512 (e.g., a keyboard), a cursor control device 514, and a signal generation device 520 (e.g., a speaker). Cursor control device 514 can, for example, include a computer mouse, voice recognition, video recognition, touch sensor, stylus, eye tracking, grip equipment, switch, sensor, etc. to interact with the video display 510.

The secondary memory 516 can include a computer-readable storage medium 524 (or more specifically a non-transitory computer-readable storage medium) on which is stored one or more sets of instructions 526 (e.g., duplication instructions executable by a system 100 in FIG. 1.) for the computer data processing system 100 embodying any one or more of the methodologies or functions described herein. The instructions 526 for the computer data processing system 100 can also reside, completely or at least partially, within the main memory 504 and/or within the processing device 502 during execution thereof by the computer system 500, the main memory 504 and the processing device 502 also constituting computer-readable storage media. The instructions 526 for the computer data processing system 100 can further be transmitted or received over a network via the network interface device 522.

While the computer-readable storage medium 524 is shown in an example to be a single medium, the term "computer-readable storage medium" should be taken to include a single medium or multiple media (e.g., a centralized or distributed database, and/or associated caches and servers) that store the one or more sets of instructions 526. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "recording," "extracting," "assembling," "monitoring," "storing," "identifying," "selecting," "comparing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the invention as described herein.

The present invention can be provided as a computer program product, or software, that can include a machine-readable medium having stored thereon instructions, which can be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the invention have been described with reference to specific example implementations thereof. It will be evident that various modifications can be made thereto without departing from the broader spirit and scope of implementations of the invention as set forth in the following claims. The specification and drawings are, accordingly, to be regarded in an illustrative sense rather than a restrictive sense.

What is claimed is:

1. A method comprising:
   recording, by a processing device, trace data that is generated for graphical user interface (GUI) interactions of a user, wherein the recorded trace data comprises multiple instances of operations performed by a development application at a system level layer, the multiple instances of the operations corresponding to the GUI interactions of the user;
   extracting a subset of the trace data from the recorded trace data, the subset of the trace data being associated with one or more of the GUI interactions corresponding to one or more of the operations of the development application that are performed on a work item, wherein extracting the subset of the trace data comprises:
      identifying an end point in the recorded trace data that is associated with the one or more operations of the development application performed on the work item, wherein identifying the end point comprises searching the recorded trace data and identifying a dynamic parameter by comparing the multiple instances of the operation; and comparing the multiple instances of the one or more operations to identify method calls, system calls, state changes, and variables associated with the one or more operations;

assembling a script in view of the subset of the trace data to duplicate the one or more operations of the development application specified by the one or more of the GUI interactions for one or more other work items; and executing, independent of output of the GUI, the assembled script to duplicate the one or more operations of the development application to modify one or more other work items.

2. The method of claim 1, wherein extracting the subset of the trace data further comprises:

selecting a portion of the recorded trace data in view of the end point, wherein the selected portion includes at least an entry point in the trace data associated with the identified end point, the variables to perform the one or more operations, or a sequence of the method calls to perform the one or more operations.

3. The method of claim 1, wherein the one or more operations of the development application performed on the work item comprises at least one of modifying, deleting, or overwriting.

4. The method of claim 1, wherein the assembled script is platform neutral.

5. The method of claim 1, wherein recording trace data comprises:

monitoring the trace data output from the development application using a trace agent of a java virtual machine; and storing the trace data in a trace data log.

6. The method of claim 1, further comprising duplicating the one or more operations of the development applications by executing the assembled script, wherein executing the assembled script does not output to the GUI.

7. The method of claim 1, wherein the development application is a rich client comprising a GUI.

8. The method of claim 1, wherein executing the assembled script comprises:
setting up an environment for the development application;
providing an entry point for performing the one or more operations of the development application; and
executing the assembled script to perform the one or more operations on the one or more other work items.

9. The method of claim 8, wherein executing the assembled script further comprises prompting a user to provide input for the variables, wherein the variables are used to perform the one or more operations on the one or more other work items.

10. A system comprising:

a memory;

a processing device operatively coupled to the memory, the processing device to:

record, by the processing device, trace data that is generated for graphical user interface (GUI) interactions of a user, wherein the recorded trace data comprises multiple instances of operations performed by a development application at a system level layer, the multiple instances of the operations corresponding to the GUI interactions of the user;

extract a subset of the trace data from the recorded trace data, the subset of the trace data being associated with one or more of the GUI interactions corresponding to one or more of the operations of the development application that are performed on a work item, wherein extracting the subset of the trace data comprises:

identifying an end point in the recorded trace data that is associated with the one or more operations of the development application performed on the work item, wherein identifying the end point comprises searching the recorded trace data and identifying a dynamic parameter by comparing the multiple instances of the operation; and comparing the multiple instances of the one or more operations to identify method calls, system calls, state changes, and variables associated with the one or more operations;

assemble a script in view of the subset of the trace data to duplicate the one or more operations of the development application specified by the one or more of the GUI interactions for one or more other work items; and execute, independent of output of the GUI, the assembled script to duplicate the one or more operations of the development application to modify one or more other work items.

11. The system of claim 10, wherein to extract the subset of trace data further comprises the processing device to:

select a portion of the recorded trace data in view of the end point, wherein the selected portion includes at least an entry point in the trace data associated with the identified end point, the variables to perform the one or more operations, or a sequence of the method calls to perform the one or more operations.

12. The system of claim 10, wherein the processing device to execute the assembled script further comprises the processing device to:

set up an environment for the development application;
provide an entry point for performing the one or more operations of the development application; and
execute the assembled script to perform the one or more operations on the one or more other work items.

13. The system of claim 12, wherein to execute the assembled script further comprises to prompt a user to provide input for the variables, wherein the variables are used to perform the one or more operations on the one or more other work items.

14. A non-transitory computer-readable storage medium comprising instructions to cause a processing device to:

record, by the processing device, trace data that is generated for graphical user interface (GUI) interactions of a user, wherein the recorded trace data comprises multiple instances of operations performed by a development application at a system level layer, the multiple instances of the operations corresponding to the GUI interactions of the user;

extract a subset of the trace data from the recorded trace data, the subset of the trace data being associated with one or more of the GUI interactions corresponding to one or more of the operations of the development application that are performed on a work item, wherein extracting the subset of the trace data comprises:

identifying an end point in the recorded trace data that is associated with the one or more operations of the development application performed on the work item, wherein identifying the end point comprises searching the recorded trace data and identifying a dynamic parameter by comparing the multiple instances of the operation; and comparing the multiple instances of the one or more operations to identify method calls, system calls, state changes, and variables associated with the one or more operations;

assemble a script in view of the subset of the trace data to duplicate the one or more operations of the development application specified by the one or more of the GUI interactions for one or more other work items; and execute, independent of output of the GUI, the assembled script to duplicate the one or more operations of the development application to modify one or more other work items.

15. The non-transitory computer readable storage medium of claim 14, wherein to extract the subset of trace data further comprises the processing device to:

select a portion of the recorded trace data in view of the end point, wherein the selected portion includes at least an entry point in the trace data associated with the identified end point, the variables to perform the one or more operations, or a sequence of the method calls to perform the one or more operations.

16. The non-transitory computer readable storage medium of claim 14, wherein the processing device to execute the assembled script further comprises the processing device to:

set up an environment for the development application;

provide an entry point for performing the one or more operations of the development application; and execute the assembled script to perform the one or more operations on the one or more other work items.

17. The non-transitory computer readable storage medium of claim 16, wherein to execute the assembled script further comprises to prompt a user to provide input for the variables, wherein the variables are used to perform the one or more operations on the one or more other work items.

* * * * *